United States Patent [19]

Tjernström

[11] Patent Number: 5,685,672
[45] Date of Patent: Nov. 11, 1997

[54] TOOLHOLDER FOR INDEXABLE INSERTS

[75] Inventor: Eric Tjernström, Gävle, Sweden

[73] Assignee: Sandvik AB, Sandviken, Sweden

[21] Appl. No.: 451,462

[22] Filed: May 26, 1995

[30] Foreign Application Priority Data

May 27, 1994 [SE] Sweden ................... 9401822

[51] Int. Cl.[6] ................................. B23P 15/28
[52] U.S. Cl. ................ 407/104; 407/108; 407/111
[58] Field of Search ................ 407/103–105, 407/107–109, 111, 112

[56] References Cited

U.S. PATENT DOCUMENTS

| 2,999,301 | 9/1961 | Conti et al. | 407/104 |
|---|---|---|---|
| 3,138,846 | 6/1964 | Conti et al. | 407/104 |
| 3,314,126 | 4/1967 | Stier . | |
| 3,577,618 | 5/1971 | Cashman | 407/104 |
| 4,035,890 | 7/1977 | Eriksson et al. | 407/104 |
| 4,398,853 | 8/1983 | Erickson | 407/104 |
| 4,477,212 | 10/1984 | Kraft | 407/104 |
| 4,600,341 | 7/1986 | Board | 407/112 |
| 5,035,544 | 7/1991 | Ikenaga et al. | 407/105 |
| 5,100,268 | 3/1992 | Nakayama et al. | 407/104 |

FOREIGN PATENT DOCUMENTS 1122431  11/1984  U.S.S.R. ................... 407/104

*Primary Examiner*—Daniel W. Howell
*Assistant Examiner*—Christopher Kirkman
*Attorney, Agent, or Firm*—Burns, Doane, Swecker & Mathis, L.L.P.

[57] ABSTRACT

A cutting insert has top and bottom surfaces and a center hole extending between those surfaces. The insert is seated in a pocket of a toolholder. A clamp is attached to a body of the toolholder by a screw which extends through a through-hole of the clamp and is threadably engaged with the body. An inner end of the clamp engages the body, and a projection at the outer end of the clamp enters the center hole of the insert. When the clamp is tightened, it is displaced downwardly such that a planar under surface of the clamp pushes downwardly against the insert, and is also displaced inwardly so that the projection of the clamp pushes the insert rearwardly against an upright support surface. The inward displacement of the clamp is achieved by causing the inner end of the clamp to engage an inclined surface of the body, or by causing a head of the screw to displace the clamp inwardly.

1 Claim, 1 Drawing Sheet

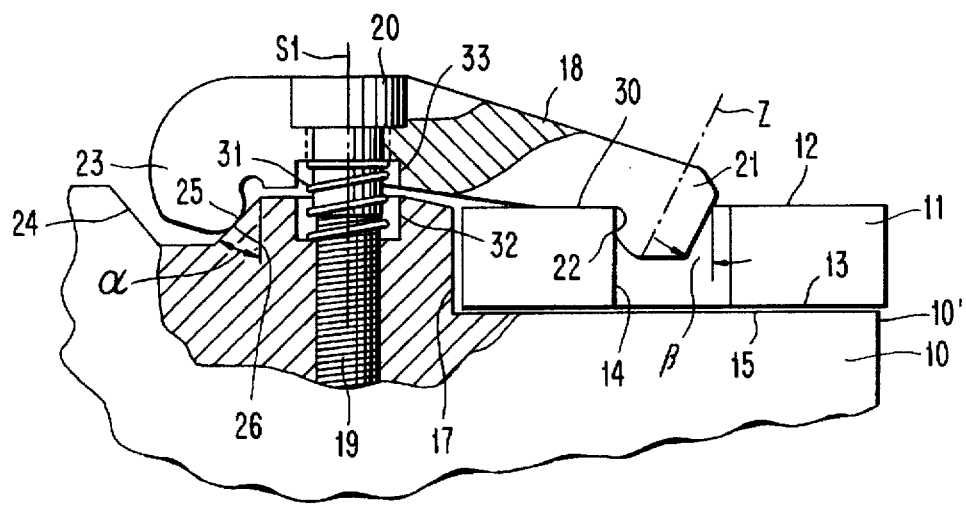
Fig. 1
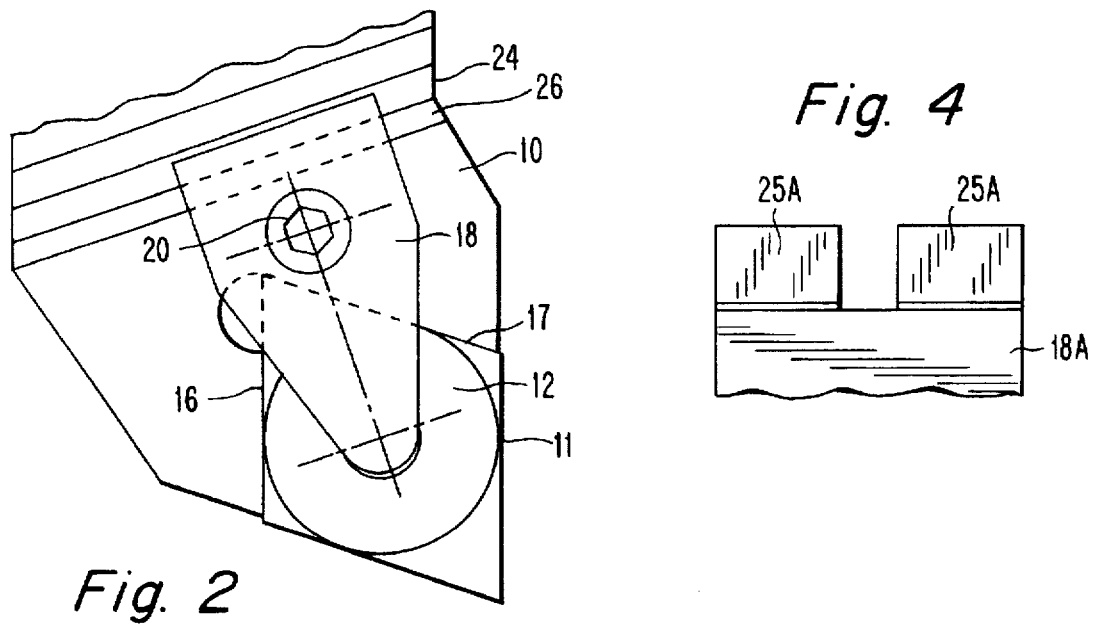
Fig. 2
Fig. 4
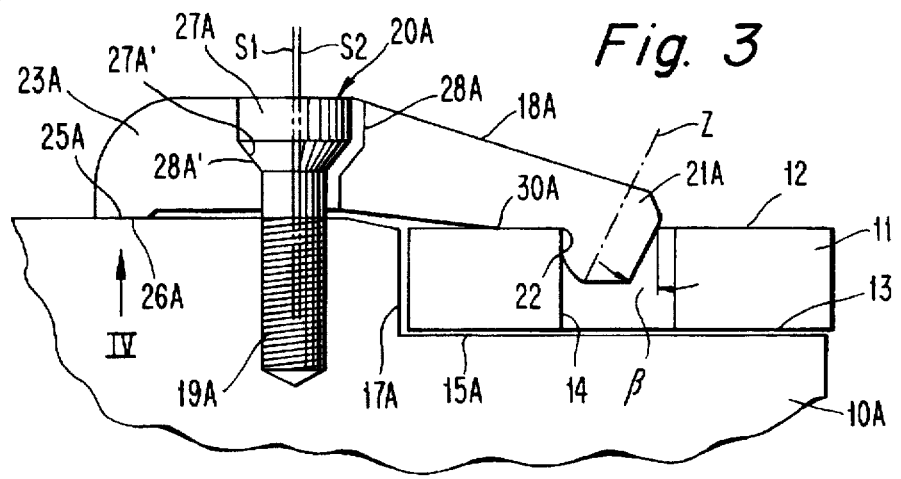
Fig. 3

5,685,672

1
TOOLHOLDER FOR INDEXABLE INSERTS

BACKGROUND OF THE INVENTION

The present invention relates to a toolholder for centrally apertured indexable inserts intended for chipforming machining of metallic workpieces, and to a method of holding the insert in the toolholder.

Indexable inserts are usually provided with nose point angles below 60° and they are usually intended for copying machining. There exists a variety of toolholders for various types of indexable inserts with nose point angles of 55° such as rhomibc, rhomboidic and triangular inserts with equal angles all around the insert. The material used for such inserts is normally cemented carbide material or ceramic material.

A commonly used locking system for such indexable inserts, disclosed for example in U.S. Pat. No. 3,314,126, includes a pin in the holder extending upwardly into the insert-receiving pocket to engage a hole in the insert located in said pocket, and means for forcing said pin to be subjected to a pivoting movement inwardly towards said holder, said forcing means being arranged to actuate the lower portion of said pin, thus urging both the pin and the insert inwardly towards an upwardly extending support wall formed on said holder at a rear end of said pocket. The drawback of such holder, however, is that the forward nose portion of the cutting insert has a tendency of coming apart from the shim plate located underneath said insert which sometimes can lead to insert failure.

SUMMARY OF THE INVENTION

In view thereof, it is an object of the invention to provide a novel arrangement and method for clamping the insert in place in the pocket which will ensure that a clamp is acting on both the top surface and in the central hole wall of the insert in such a way that both downwardly and laterally acting clamp forces will keep the insert firmly and safely in place in its location without any tendency of coming apart from its underneath supporting surface.

According to the invention, a toolholder is provided having a pocket for receiving an insert with a central hole therein, and a clamp is arranged having a forward end, and a rear end. A clamping bolt extends through the clamp and is threadably engaged in the holder body. The forward end of the clamp is provided with two clamping surfaces one of which is arranged to engage the wall of the insert hole and the other being arranged to abut with an upper surface portion of the insert located between said insert hole and a rearwardly located upstanding supporting wall of the insert-receiving pocket.

In accordance with one preferred embodiment of the invention, the rear end portion of the clamp is adapted to come into abutment with a forwardly and upwardly inclined cam surface provided on the holder body to displace the clamp rearwardly. In another preferred embodiment, a head of the clamping bolt is eccentrically arranged relative to a through-hole of the clamp so as to displace the clamp rearwardly as the bolt is tightened.

The invention also relates to the method of holding the insert in the pocket.

BRIEF DESCRIPTION OF THE DRAWINGS

The invention will now be described more in detail by reference to the enclosed drawings which illustrate preferred embodiments of the invention:

2

FIG. 1 is a side view of a toolholder according to the invention,

FIG. 2 is a plan view of the toolholder shown in FIG. 1,

FIG. 3 is a side view of an alternative embodiment of the invention,

FIG. 4 is a bottom view of an inner end of the clamp, as viewed in the direction of arrow IV in FIG. 3.

DETAILED DESCRIPTION OF PREFERRED EMBODIMENTS OF THE INVENTION

In FIGS. 1–2 there is shown a portion of a cutting tool for turning operations comprising a partially shown toolholder 10 for left hand turning, the forward nose portion of which is provided with a pocket for the receipt of an indexable cutting insert 11 of polygonal shape. This insert has a rhombic basic shape with nose point angles less than 60°. The insert has a top, including a raised upper flat surface 12, and a bottom having a similar lower flat surface 13 oriented parallel with said upper surface. The insert has four side surfaces extending perpendicularly towards said upper and lower flat surfaces 12, 13. Two of the side surfaces are arranged to come into surface abutment with two upstanding support surfaces 16 and 17 of the insert-receiving pocket, whereas said lower flat surface 13 is intended to rest against a bottom supporting surface 15 of said insert-receiving pocket. The insert has a central hole 14. The bottom supporting surface 15 could either be a surface portion of the holder itself or a separate shim plate mounted in the insert-receiving pocket of said holder.

There is a clamp 18 provided for the clamping of the insert into its pocket in the holder 10, said clamp being actuatable by means of a clamp screw 20 that extends entirely through said clamp and threadably engages a bore 19 in the holder 10. The central axis S1 of said screw extends parallel to the central axis of the hole 14 in the insert. The forward end of said clamp is in the shape of an inclined first protrusion 21 which is inclined downwardly and inwardly. (By "inwardly" as used throughout this specification and claims is meant a direction away from a front or outer end 10' of the pocket, i.e., a direction extending to the left in FIG. 1). The first protrusion 21 includes a contact surface which faces the support surface 17 and is intended to engage with the inwardmost portion of the wall of said hole 14 at a contact point 22 located at a distance downwardly from the upper surface 12 of the insert. Thus, a lower portion of the contact surface is located closer to the support surface 17 than is an upper portion of the contact surface. The opposite end of said clamp is in the shape of a second protrusion 23 that is received in a recess 24 in the holder 10. The end surface 25 of said protrusion 23 is in the form of a flat surface or preferably in the shape of two laterally spaced convex surfaces for surface abutment with a planar contact surface 26 in said recess 24 that is inclined at an angle α in relation to the central axis S1 of the clamp screw 20. (By "laterally spaced" is meant spaced in a direction extending perpendicular to the plane of the paper.)

FIG. 3 shows an alternative embodiment of the invention. Elements of the holder and clamp in FIG. 3 which correspond to those of FIGS. 1, 2 have the same reference numeral followed by the suffix "A". In this embodiment the abutment surface 25A of the rearward end portion of the clamp 18A is in the shape of two laterally spaced flat surfaces for surface abutment with a corresponding flat abutment surface 26A of the holder, said flat surface 25A of the clamp being parallel with the upper surface 12 of the insert. In this case the clamp-actuating screw 20A has a conically shaped head 27A, the central axis S1 of which is laterally displaced in relation to the central axis S2 of the recess 28A in the clamp. More specifically, the central axis S1 of said screw is eccentrically displaced inwardly as compared with the central axis S2 of said recess 28A, thereby ensuring that the clamp 18A is urged inwardly upon tightening said screw into threaded engagement with the corresponding threaded bore 19A of said holder body 10A. During such tightening, a frusto-conical surface 27A' of the head 27A engages a correspondingly shaped surface 28A' of the recess 28A.

The clamp 18 (or 18A) has a flat under surface 30 (or 30A) located between the first protrusion 21 (or 21A) and the clamp screw 20 (or 20A). The under surface 30 (or 30A) is intended for flat surface abutment against a portion of top surface 12 that is located between the central hole 14 and the upstanding side support surface 17 (or 17A) Thus, the under surface 30A extends parallel to the abutment surface 26A of the body, since the abutment surface 25A is parallel with the upper surface 12 of the insert, as described earlier. In a preferred embodiment said under surface 30 (or 30A) is so dimensioned that it comes into flat surface abutment along a major portion of the area of said top surface 12 located between the hole 14 and support surface 17 (or 17A).

In the embodiments shown in FIGS. 1-3, the protrusion 21 (or 21A) has an axis of symmetry Z that extends downwardly and inwardly at an angle β that is substantially equal to or somewhat smaller than the previously described angle α.

The toolholder in FIGS. 1-2 is furthermore provided with a helical spring 31 so that the clamp is biased upwards upon loosening the screw 20. The spring 31 is partially received in a cylindrical counterbore 32 in the holder body and partially received in a similar cylindrical counterbore 33 formed in the underside of the clamp 18.

In operation of the embodiment of FIGS. 1-2, upon actuating the clamp 18 by threadably tightening the screw 20, the clamp 18 is pressed downwards, thus urging the laterally spaced surfaces 25 to slide downwardly and inwardly along contact surface 26 at the same time as the under surface 30 is brought into planar surface abutment with said top surface 12 to press the insert downwardly. As the clamp 18 is displaced inwardly, the forward protrusion 21, which engages the insert hole 14 at the point 22 spaced distantly from said top surface 12, pushes the insert inwardly. Due to said inclined surface 26 being inclined at an angle α a favorable wedging action is achieved which ensures that effective vertically downward and laterally inward clamping forces will act on said insert to press the insert against the surfaces 15, 16, 17. The size of the angle α should be selected in the range of 15 to 50 degrees, preferably within the range 20 to 40 degrees.

In operation of the embodiment according to FIG. 3, upon tightening the screw 20A, the head 27A of the screw pushes the clamp 18A inwardly (i.e., to the left in FIG. 3) as the underside 30A of the clamp engages the top surface 12 of the insert to press the insert downwardly. As the clamp 18A is displaced inwardly, the forward protrusion 21A, which engages the insert hole 14, imposes downward and inward clamping forces on the insert.

Although the present invention has been described in connection with preferred embodiments thereof, it will be appreciated by those skilled in the art that additions, modifications, substitutions, and deletions not specifically described may be made without departing from the spirit or scope of the invention as defined in the appended claims.

What is claimed is:

1. A toolholder adapted for holding a cutting insert having a center hole, comprising:

a body forming a pocket having a bottom surface and at least one upstanding support surface disposed adjacent an inward portion of said bottom surface, said body including a flat abutment surface spaced inwardly from said pocket, and a threaded bore situated between said pocket and said abutment surface; and a clamp mounted on said body by a screw passing through a recess of said clamp and threadedly engaging said body, said clamp arranged to be displaced downwardly and inwardly in response to tightening of said screw, said clamp including inner and outer ends, said inner end engaging said body and said outer end including a downward projection adapted to extend into a center hole of an insert and engage a wall of such center hole to push the insert inwardly against the support surface as the clamp is displaced inwardly, said clamp further including a planar under surface extending parallel to said abutment surface of said body, said under surface disposed between said downward projection and said inner end and adapted for engaging a top surface of a cutting insert to push the insert downwardly against said bottom surface of said pocket as said clamp is displaced downwardly;

said screw including an externally threaded portion threadedly engaging said bore and an enlarged head receivable in said recess said head being of smaller cross section than said recess and including a frusto-conical surface for engaging a corresponding shaped surface of said recess to displace said clamp such that said projection approaches said support surface during tightening of said screw;

said inner end of said clamp comprising a pair of laterally spaced flat surfaces enaging said flat abutment surface of said body.

* * * * *